(12) United States Patent
Hagiwara et al.

(10) Patent No.: US 6,956,559 B2
(45) Date of Patent: Oct. 18, 2005

(54) CHARACTER INPUT APPARATUS

(75) Inventors: Yasuji Hagiwara, Fukushima-ken (JP); Masahiro Soma, Fukushima-ken (JP); Youtaro Sakakura, Fukushima-ken (JP); Hiroshi Nakahama, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 558 days.

(21) Appl. No.: 09/819,273

(22) Filed: Mar. 28, 2001

(65) Prior Publication Data

US 2001/0048422 A1 Dec. 6, 2001

(30) Foreign Application Priority Data

May 24, 2000 (JP) ........................................ 2000-152563

(51) Int. Cl.[7] .................................................. G09G 5/08
(52) U.S. Cl. ........................ 345/156; 345/161; 345/162; 345/168; 345/171; 400/484; 707/536
(58) Field of Search ................................. 345/156, 161, 345/162, 168, 171; 400/484; 707/536

(56) References Cited

U.S. PATENT DOCUMENTS

| | | | | |
|---|---|---|---|---|
| 4,777,600 A | * | 10/1988 | Saito et al. .................. 707/535 |
| 5,468,924 A | * | 11/1995 | Naitou et al. ................ 200/6 A |
| 5,473,325 A | * | 12/1995 | McAlindon .................. 341/20 |
| 5,831,596 A | * | 11/1998 | Marshall et al. ............. 345/161 |
| 5,903,257 A | | 5/1999 | Nishiumi et al. |
| 5,966,719 A | * | 10/1999 | Okumura ...................... 707/536 |
| 6,002,388 A | * | 12/1999 | Seffernick et al. ........... 345/161 |
| 6,011,542 A | * | 1/2000 | Durrani et al. .............. 345/156 |
| 6,175,358 B1 | * | 1/2001 | Scott-Jackson et al. ..... 345/161 |
| 6,184,867 B1 | * | 2/2001 | Kandogan et al. ........... 345/161 |
| 6,285,356 B1 | * | 9/2001 | Armstrong ................... 345/167 |
| 6,300,937 B1 | * | 10/2001 | Rosenberg ................... 345/156 |
| 6,323,840 B1 | * | 11/2001 | Steinbrunner ................ 345/161 |
| 6,331,849 B1 | * | 12/2001 | VandenBoom .............. 345/161 |
| 6,362,810 B1 | * | 3/2002 | Matsuda ....................... 345/161 |
| 6,377,243 B1 | * | 4/2002 | Tomoda et al. ............. 345/163 |
| 6,381,027 B1 | * | 4/2002 | Tanaka ........................ 358/1.11 |
| 6,482,010 B1 | * | 11/2002 | Marcus et al. ................ 434/45 |
| 6,580,414 B1 | * | 6/2003 | Wergen et al. .............. 345/156 |

\* cited by examiner

*Primary Examiner*—Bipin Shalwala
*Assistant Examiner*—Vincent E. Kovalick
(74) *Attorney, Agent, or Firm*—Brinks Hofer Gilson & Lione (57) ABSTRACT

An operation unit is provided with an operation body operated by hand, a first detection unit for detecting the inclination operation of the operation body, and a second detection unit for detecting the pushing-down operation of the operation body. Any of 26 alphabetical characters "A, B, C, . . . , X, Y, and Z" is selected corresponding to the inclination direction of the operation body. The displayed character is changed successively by rotating the operation body in X-Y coordinate plane. The selected character is finalized by pushing down the operation unit in Z-direction.

30 Claims, 4 Drawing Sheets

CHARACTER INPUT APPARATUS

BACKGROUND OF THE INVENTION

1. Field of the Invention

The present invention relates to a character input apparatus used for entering, for example, character data such as alphabets, hiragana, katakana, alphabetical characters, and numeral strings simply.

2. Description of the Related Art

The character input apparatus has been used for various electronic apparatuses such as personal computers, portable phones, and game machines.

A key board apparatus is used for character input in a personal computer. A key board apparatus has a plurality of key tops arranged according to the predetermined specification. In the case of the key board of this type, 26 alphabets (alphabetical characters), kana characters, numerals, and symbols are assigned to respective key tops. In the case of a key board apparatus used for a personal computer, usually many key tops are arranged, the input of an alphabet is carried out by selecting alphabets assigned to respective key tops successively.

The portable phone is used as a means for communication with other persons, and communication is carried not only by means of voice but also by means of character. In the case of communication by means of character, characters are entered by operating desired keys of a portable phone. For example, "A, B, and C", "D, E, and F", . . . "W, X, Y and Z" are assigned to number 2, number 3, . . . , number 9 numeral keys respectively. In the case that "E" is to be entered, the number 3 numeral key is pushed twice, and in the case that "Z" is to be entered, the number 9 numeral key is pushed four times.

The exclusive controller is used for the television game and personal computer game in order to improve the operability. For example, characters are entered when a player name is entered when a game is started, when a conversation sentence is entered for dialog game, or when a file name is entered for saving the game on the halfway. In such case, for example, the alphabetical character data is displayed on a screen, a cursor that indicates the selectable position is moved to the character data by operating a direction key of a controller, and input operation is carried out.

However, the above-mentioned conventional character input apparatus is involved in the problem described hereunder.

In detail, in the case of character input by use of the key board apparatus, it is required to secure a space for placing the key boagd such as a desk, and the key board cannot be used without space. Furthermore, it is difficult to enter the character quickly for a person who does not remember the key arrangement, thus the key board can be used by not everyone. Furthermore, in the case of character input by use of the portable phone, it is difficult to enter the character quickly because the key operation is required many times. Furthermore, in the case of the controller for game machines, it takes a long time to move a cursor to a desired character because the cursor is moved by operating a plurality of keys, and also it is difficult to enter the character quickly.

SUMMARY OF THE INVENTION

The present invention has been accomplished to solve the above-mentioned problem, and it is an object of the present invention to provide a character input apparatus that is used by any person to enter the character simply and quickly anywhere.

The character input apparatus of the present invention is characterized by comprising an operation unit, a support for supporting the operation unit so as to be inclinable, a first detection unit for generating a different signal corresponding to the inclination direction of the operation unit, a second detection unit for generating a signal based on a motion when the operation unit is moved in the direction different from the above-mentioned inclination direction, and a control unit for selecting any data from among N data groups based on the detected output from the first detection unit when the operation unit is inclined and for finalizing the data selected based on the detected output from the second detection unit when the operation unit is operated in the direction different from the inclination direction.

For example, the support is provided with two rotational shafts that are rotated when the operation unit is inclined and two rotation detection means for detecting the rotation magnitude of each rotation shaft, the two rotation detection means constitute the first detection unit, and the detected output is obtained from the second detection unit when the operation unit is moved in the direction perpendicular to the rotational shafts.

The structure in which the control unit selects the data successively based on the output change of the first detection unit when the inclination direction of the operation unit is changed while the inclination of the operation unit that is inclined in a desired direction is being maintained may be employed.

For example, the above-mentioned N data groups include 26 alphabetical characters A, B, C, . . . , Z, or otherwise may be the N data groups include hiragana, katakana, numerals, or symbols, or may be combination of these data.

A conversion means for converting the input data of alphabetical character to kana characters or further to kanji characters may be provided additionally.

When the control unit selects the data and the selected data is displayed on the display unit, the control unit may generate the display data so that not only the data selected based on the inclination direction of the operation unit but also one data or a plurality of data positioned before and after adjacent to the selected data is displayed simultaneously on the display unit.

The above-mentioned present invention is effectively used particularly for character input, it is not necessary to secure the place where the apparatus is to be placed and to repeat key operation very often, and character input operation can be carried out simply and quickly.

The character can be selected and finalized with only one operation unit, and the character input operation can be carried out with only one hand.

The character input apparatus of the present invention may be used not only for game machine but also for mobile apparatus to enter E-mail for entering characters.

DETAILED DESCRIPTION OF THE PREFERRED EMBODIMENTS

Figure 1:
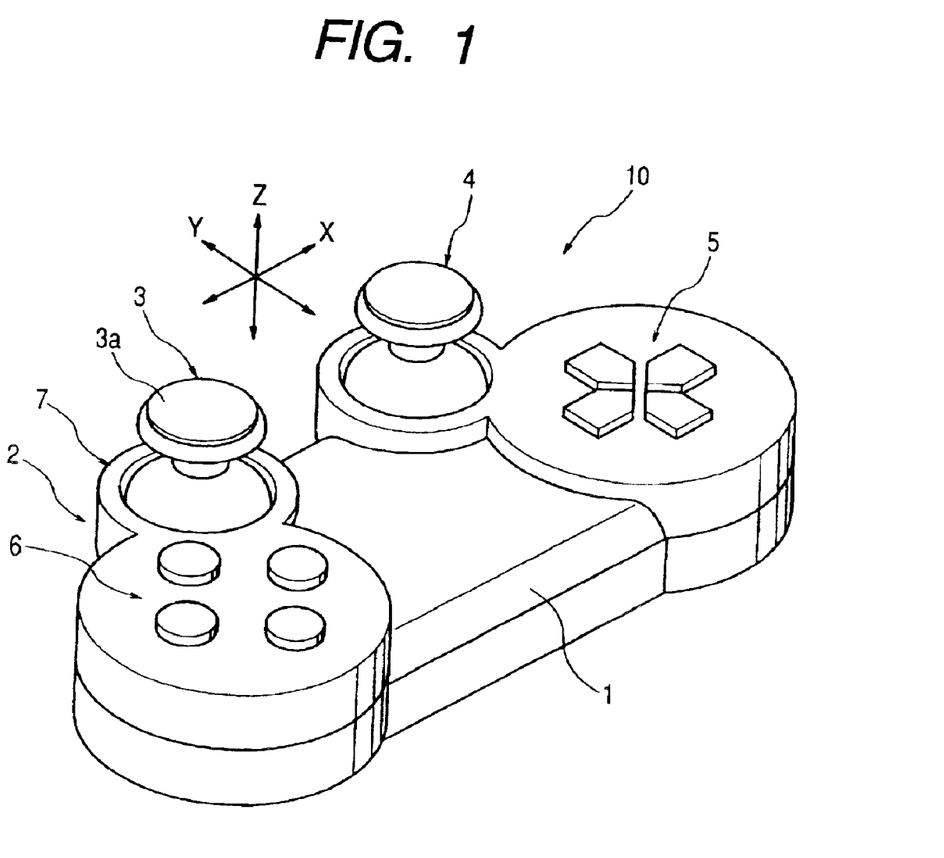
FIG. 1 is a perspective view illustrating an embodiment of a character input apparatus of the present invention.
Figure 2:
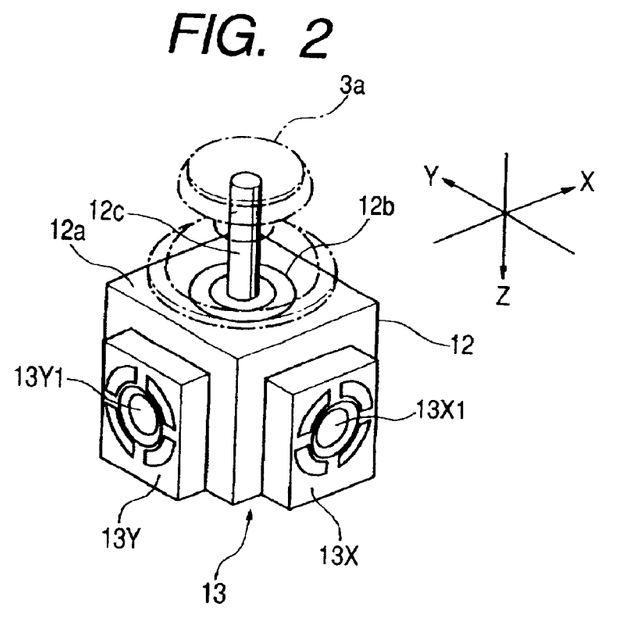
FIG. 2 is a perspective view illustrating a first detection unit.
Figure 3:
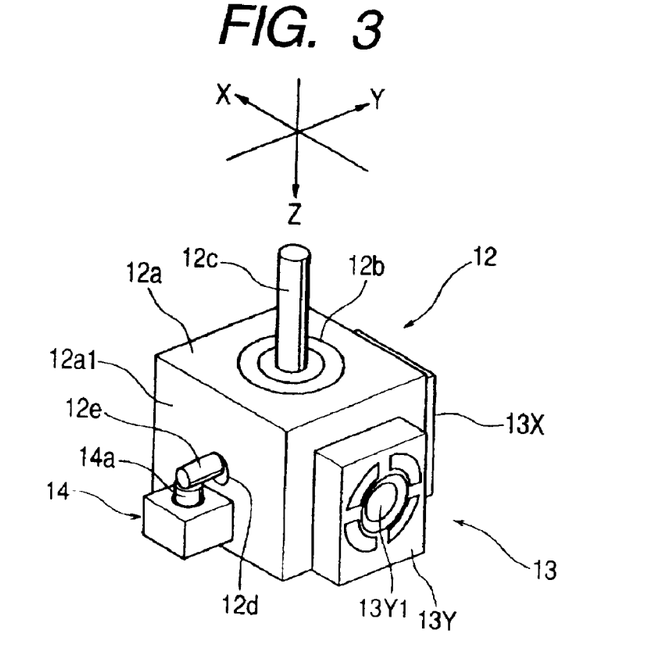
FIG. 3 is a perspective view illustrating a second detection unit.
Figure 4A:
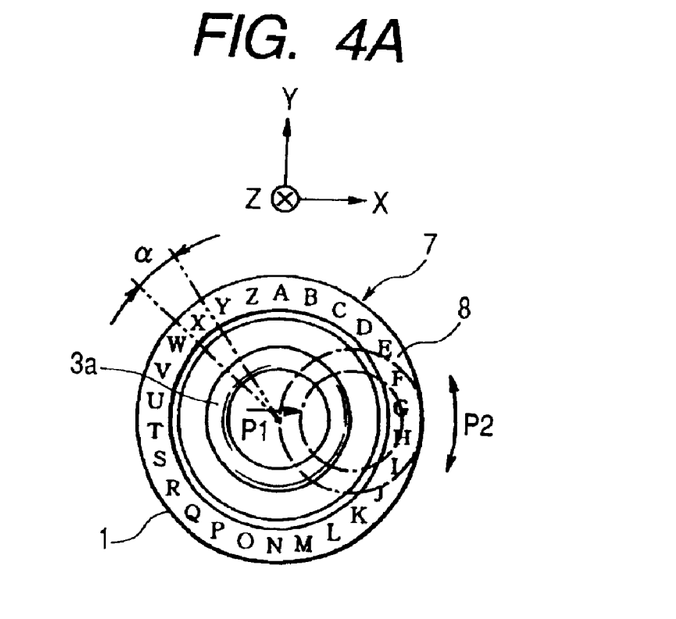
FIG. 4A is a plan view for describing the operation.
Figure 4B:
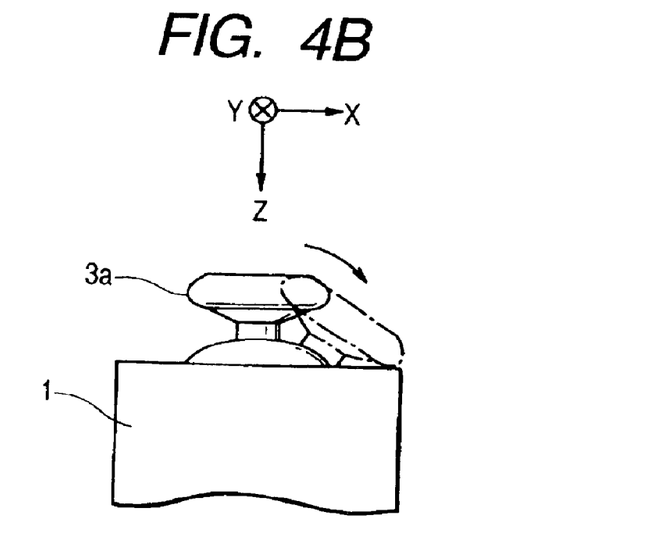
FIG. 4B is a side view for describing the operation.
Figure 5:
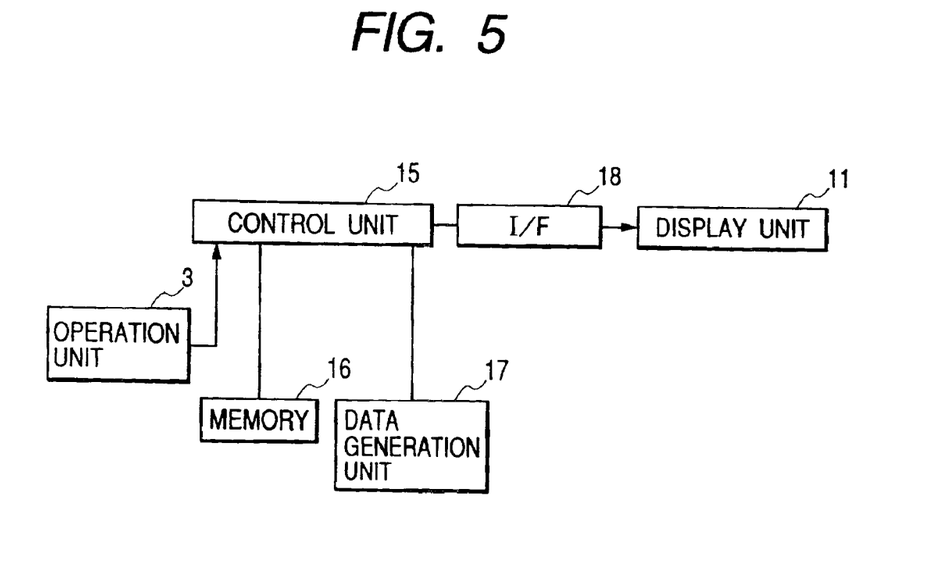
FIG. 5 is a functional block diagram.

FIG. 1 is a perspective view illustrating an embodiment of an exemplary character input apparatus of the present invention, FIG. 2 is a perspective view illustrating a first detection unit, FIG. 3 is a perspective view illustrating a second detection unit, FIG. 4A is a plan view for describing the operation, FIG. 4B is a side view for describing the operation, and FIG. 5 is a functional block diagram.

The character input apparatus 2 of the present invention is used for character input as required, which is mounted on a game controller 10 such as game pad as shown in FIG. 1 and used as one operation unit of the controller 10.

In the case that the controller 10 is used for the television game, the controller 10 is connected to a game machine body with a predetermined cable, and the game machine body is connected to a home television receiver that is used as a display unit with a predetermined cable for using. Otherwise, in the case that the controller 10 is used for the computer game, the controller 10 is connected to an assigned game port of the computer body with a predetermined cable, and a display that is a built-in display of the computer or a separate display is used as the display unit.

The character input apparatus 2 shown in FIG. 1 is contained in a box 1 having a small size that is portable and fits in hand. The box 1 is provided with operation switches 4, 5, and 6 that are used for game operation. Respective different key operations are assigned to these operation switches 4, 5, and 6 for each application used.

The operation switch 4 has the same structure as that of the operation unit 3 used for the character input apparatus 2, and the operation switch 4 may be used as the operation unit of the character input apparatus 2. Furthermore, each of the operation switches 5 and 6 comprises a push-button type switch that is switchable between ON and OFF.

Any operation unit 3 may be used as long as it is an analog detectable switch that has been used generally. For example, the operation unit 3 has an operation body 3a that is the part to be operated by hand, a support member (support unit) 12, a first detection unit 13, and a second detection unit 14 as shown in FIG. 2 and FIG. 3.

The support member 12 is provided with a cubic box frame 12a. A through hole 12b is formed on the top surface of the frame 12a, a support shaft 12c is disposed projectingly upward through the through hole 12b, and the operation body 3a is attached to the support shaft 12c. Furthermore, the support member 12 is provided with a rotational shafts 13X1 and 13Y1 extending in X-axis and Y-axis respectively, and the rotational shafts 13X1 and 13Y1 are supported rotatably by the frame body 12a. The operation body 3a is operated to incline the support shaft 12c, the support shaft 12c functions then to rotate the rotational shaft 13X1 and 13Y1. Furthermore, the support shaft 12c is structured so as to be moved in Z-direction with respect to the rotational shafts 13X1 and 13Y1. As described above, the support 12c can be moved in Z-direction by pushing, and the rotational shafts 13X1 and 13Y1 can be rotated by inclining the support shaft 12c.

Though not shown in the drawing, the operation unit 3 is provided with a returning means for returning the operation body 3a always to the original position, namely the upper position of zero degree inclination (opposite Z-direction).

As described hereinabove, the operation body 3a is supported so as to be inclinable with respect to the box 1 and so as to be returnable to the original position.

Variable resistors 13X and 13Y are disposed on the side surface of the frame 12a as the rotation detection means, which functions as the first detection unit 13. The variable resistor 13X is disposed on one side surface in Y-axis direction of the frame 12a, and the rotation of the rotation axis 13X1 extending in Y-axis direction in the support member 12 is detected by means of the variable resistor 13X. On the other hand, the variable resistor 13Y is disposed on one side surface in X-axis direction of the frame 12a, and the rotation of the rotational axis 13Y1 extending in X-direction in the support member 12 is detected by means of the variable resistor 13Y.

As shown in FIG. 3, the support member 12 is provided with the second detection unit 14. The second detection unit 14 is disposed on the side surface 12a1 in Y-axis direction of the frame 12a fixedly as shown in FIG. 3. The second detection unit 14 contains an ON/OFF type micro-switch (not shown in the drawing), and a small projection 14a is disposed on the top surface projectingly upward so as to link to the micro-switch. The small projection 14a is always pushed urgently upward and supported movably in the vertical direction (Z-direction)

On the other hand, a through hole 12d having a slightly oval shape is formed on the side surface 12a1 of the frame 12a of the support member 12. A projection 12e that is movable in Z-direction together with the support shaft 21c projects out from the through hole 12d. The projection 12e is in contact with the top surface of the small projection 14a.

When the operation body 3a is inclined by hand in Y-axis direction, only the slider in the variable resistor 13X is rotated correspondingly to the operation by means of the rotational shaft 13X1 of the first detection unit 13. On the other hand, when the operation body 3a is inclined by hand in X-axis direction, only the slider in the variable resistor 13Y is rotated correspondingly to the operation by means of the rotational shaft 13Y1 of the first detection unit 13. Furthermore, when the operation body 3a is inclined in the combined direction of X-axis and Y-axis, both the slider in the variable resistor 13X and the slider in the variable resistor 13Y are rotated simultaneously, and a resistance value different from the resistance value is generated depending on the combination of respective resistance values of both resistors.

The switch output is switched between ON and OFF by means of the second detection unit 14. In detail, while the operation body 3a is being not operated, the small projection 14a is being pushed urgently upward by means of an urgent pushing member not shown in the drawing, and the projection 14a is in contact with the projection 12e and the switch is being OFF. When the operation body 3a is pushed down by hand in Z-direction, the small projection 14a is pushed down against the urgent pushing force of the urgent pushing member and the switch is turned on, and when the operation body 3a is released from the hand, the operation body returns to the original position and the switch is turned off.

Furthermore, on the character input apparatus 2, the data group (alphabet) 8 of the total of 26 characters comprising A, B, C, . . . , X, Y, and Z are formed by printing in the order at the respective predetermined positions 7 on the entire periphery of the operation unit 3 of the box 1 on which the operation unit 3 is provided as shown in FIG. 4A. An angular region α of (360/26), which is a value obtained by equally dividing 360 degrees by 26, is allocated to each alphabet. When the operation body 3a is inclined within a certain angular region α, the same character is selected as the data. Not all the alphabets 8 may be formed, and some alphabetical characters may be selectively formed as required depending on the display area of the predetermined position 7. Otherwise, the character is formed not on the box 1 side but on the operation body 3a side.

The character input apparatus 2 is provided with a control unit 15, a memory 16, and a data generation unit 17 in addition to the operation unit 3 as shown in FIG. 5. The control unit 15 is connected to the operation unit 3, the memory 16, and the data generation unit 17, and the input character data (alphabet) entered by use of the operation unit 3 is supplied to a display unit such as a television receiver or a computer display 11 connected to the control unit 15 through an interface 18.

In detail, when the operation body 3a is inclined, the inclination direction data that represents the inclination direction of the operation body 3a is generated based on the resistance value generated from the variable resistor 13X and/or the variable resistor 13Y of the first detection unit 13 in the control unit 15. The position of the alphabet region that is selected from among 26 characters is discriminated, and the code data specific to the character data is generated. The data generation unit 17 generates the display (font) data comprising a character corresponding to the code data, and one alphabet out of alphabets 8 corresponding to the display data is displayed on the display unit 11. The memory 16 stores the display data corresponding to the code data. The memory 16 may be used partially as a storage region for storing the input character data.

When the operation body 3a is rotated along the X-Y coordinate plane while the inclination of the operation body 3a is being maintained, the resistance value detected from the variable resistors 13X and 13Y is changed, and the display data different from the above is generated and the display on the display unit 11 is changed.

After the desired character data (alphabets) is selected by the above-mentioned operation, when the operation body 3a is pushed down in Z-direction (downward), the switch output is detected by means of the second detection unit 14. Thereby, the selected character data is finalized, and the character data is displayed on the predetermined position of the display unit 11.

In detail, when the operation body 3a is pushed down, the projection 12e is lowered slightly correspondingly to the pushing down operation, and the projection 12e pushes down the small projection 14a against the urgent pushing-up force. Thereby, the switch output is turned on, and the pushing operation of the operation body 3a is detected. When the pushing-down force exerted on the operation body 3a is released, the small projection 14a and projection 12e is returned to the original position by the urgent pushing-up force, and the switch output is turned off. When the operation body 3a is to be pushed down, it is recommended that the operation body 3a is pushed down after the operation body 3a is returned to the original position.

For example, in the case that the target character is "G", the operation body 3a is inclined up to the inclination angle limit in the direction where the target character is displayed (P1 direction) as shown in FIG. 4A and FIG. 4B based on the detection operation of the first detection unit 13 and the second detection unit 14. Thereby, the character "G" is selected, and the character data is displayed on the predetermined position on the display unit 11. In this case, if the target character cannot be displayed in the first inclination operation, then the operation unit 3 is rotated in the horizontal direction (P2 direction) along X-Y coordinate plane while the operation unit 3 is being inclined up to the inclination angle limit. Thereby, the resistance value generated from the first detection unit is changed, and the character data displayed on the display unit 11 is changed as "H→I→J . . . ." or "F→E→D . . . ". The character selection is finely adjusted easily, and the character data can be selected quickly.

Not only one selected alphabet character but also additional one alphabet character or a plurality of alphabet characters positioned before and after adjacent to the selected alphabet character may be displayed simultaneously on the display unit 11. When the second detection unit 14 is operated, the character that positions at the center of the character strings displayed on the display unit 11 is selected.

As described hereinabove, in the character input apparatus 2 of the present invention, the screen of the display unit may be processed by means of the software correspondingly to the progress of, for example, a game so as to be switched to the character input screen. Otherwise, an operation switch of the controller 10 may be operated so as to be switched to the character input operation as desired.

The character input apparatus of the present invention is by no means limited to the above-mentioned embodiment, for example, in the case that the same operation unit (operation switch 4) as the operation unit 3 is provided as shown in FIG. 1, the alphabet is allocated to the operation unit 3 and the operation switch 4, and the input operation may be carried out by use of both operation units. Thereby, the angular region allocated to one character can be wide, and the necessity of fine adjustment in which the operation unit is rotated in X-Y coordinate plane is reduced, and the mis-operation is reduced.

The symbol data such as space and dot or the like may be entered in addition to the alphabetical character in the character input apparatus instead of the character. Furthermore, alphabetical characters by means of roman letter input may be converted to kana characters, or kana characters may be further converted to kanji characters.

The above-mentioned character input apparatus may be used not only for the game pad but also for a portable phone, personal computer, car navigation system, audio system, and digital camera.

The present invention described hereinabove is effectively used particularly in the case that the character data is entered, the character is entered with holding the apparatus anywhere easily and quickly by finger. As described above, one character is entered by two actions, namely inclining and pushing of the operation unit, and an operator who is not familiar with the operation can master the operation easily.

What is claimed is:

1. A character input apparatus comprising:
   an operation unit;
   a support that supports the operation unit so as to be inclinable;
   a first detection unit that generates a different signal corresponding to an inclination direction of the operation unit;
   a second detection unit that generates a signal based on a motion when the operation unit is moved in a direction different from the inclination direction; and
   a control unit that selects character data from among N data groups based on detected output from the first detection unit when the operation unit is inclined and that finalizes data selected based on detected output from the second detection unit when the operation unit is operated in the direction different from the inclination direction, wherein the support is provided with two rotational shafts that are rotated when the operation unit is inclined and two rotation detection means for detecting a rotation magnitude of each rotation shaft, the two rotation detection means constitute the first detection unit, and the detected output is obtained from the second detection unit when the operation unit is moved in a direction perpendicular to the rotational shafts.

2. The character input apparatus according to claim 1, wherein the control unit selects the data successively based on the output change of the first detection unit when the inclination direction of the operation unit is changed while the inclination of the operation unit that is inclined in a desired direction is being maintained.

3. The character input apparatus according to claim 1, wherein the N data groups include 26 alphabetical characters A, B, C, . . . , Z.

4. The character input apparatus according to claim 3, wherein a conversion means for converting the input data of alphabetical character to kana characters is provided additionally.

5. The character input apparatus according to claim 3, wherein a second conversion means for converting the kana characters to kanji characters is provided additionally.

6. The character input apparatus according to claim 1, wherein, when the control unit selects the data and the selected data is displayed on the display unit, the control unit generates the display data so that not only the data selected based on the inclination direction of the operation unit but also one data or a plurality of data positioned before and after adjacent to the selected data is displayed simultaneously on the display unit.

7. The character input apparatus according to claim 1, wherein the signal generated by the first detection unit corresponds solely to the inclination direction of the operation unit so long as the operation unit has been inclined by a minimum amount from a center position of the operation unit.

8. The character input apparatus according to claim 1, wherein a particular angular range uniquely and permanently defines a particular character data.

9. The character input apparatus according to claim 1, wherein the character data selected corresponds solely to the inclination direction of the operation unit so long as the operation unit has been inclined by a minimum amount from a center position of the operation unit.

10. The character input apparatus according to claim 1, wherein the character data is provided on a periphery of the operation unit and corresponds to the character data selected when the operation unit is inclined.

11. The character input apparatus according to claim 10, wherein the character data is provided on the entire periphery of the operation unit.

12. A character input apparatus comprising:
an operation unit;
a support that supports the operation unit so as to be inclinable;
a first detection unit that generates a different signal corresponding to an inclination direction of the operation unit;
a second detection unit that generates a signal based on a motion when the operation unit is moved in a direction different from the inclination direction; and
a control unit that selects character data from among N data groups based on detected output from the first detection unit when the operation unit is inclined and that finalizes data selected based on detected output from the second detection unit when the operation unit is operated in the direction different from the inclination direction,
wherein the control unit selects the data successively based on the output change of the first detection unit when the inclination direction of the operation unit is changed while the inclination of the operation unit that is inclined in a desired direction is being maintained.

13. The character input apparatus according to claim 12, wherein the N data groups include 26 alphabetical characters A, B, C, . . . , Z.

14. The character input apparatus according to claim 13, wherein a conversion means for converting input data of alphabetical character to kana characters is provided additionally.

15. The character input apparatus according to claim 13, wherein a second conversion means for converting the kana characters to kanji characters is provided additionally.

16. The character input apparatus according to claim 12, wherein, when the control unit selects the data and the selected data is displayed on a display unit, the control unit generates the display data so that not only the data selected based on the inclination direction of the operation unit but also one data positioned adjacent to the selected data is displayed simultaneously on the display unit.

17. The character input apparatus according to claim 12, wherein the signal generated by the first detection unit corresponds solely to the inclination direction of the operation unit so long as the operation unit has been inclined by a minimum amount from a center position of the operation unit.

18. The character input apparatus according to claim 12, wherein a particular angular range uniquely and permanently defines a particular character data.

19. The character input apparatus according to claim 12, wherein the character data selected corresponds solely to the inclination direction of the operation unit so long as the operation unit has been inclined by a minimum amount from a center position of the operation unit.

20. The character input apparatus according to claim 12, wherein the character data is provided on a periphery of the operation unit and corresponds to the character data selected when the operation unit is inclined.

21. The character input apparatus according to claim 20, wherein the character data is provided on the entire periphery of the operation unit.

22. A character input apparatus comprising:
an operation unit;
a support that supports the operation unit so as to be inclinable;
a first detection unit that generates a different signal corresponding to an inclination direction of the operation unit;
a second detection unit that generates a signal based on a motion when the operation unit is moved in a direction different from the inclination direction; and
a control unit that selects character data from among N data groups based on detected output from the first detection unit when the operation unit is inclined and that finalizes data selected based on detected output from the second detection unit when the operation unit is operated in the direction different from the inclination direction,
wherein a particular angular range uniquely and permanently defines a particular character data.

23. The character input apparatus according to claim 22, wherein the N data groups include 26 alphabetical characters A, B, C, . . . , Z.

24. The character input apparatus according to claim 23, wherein a conversion means for converting input data of alphabetical character to kana characters is provided additionally.

25. The character input apparatus according to claim 23, wherein a second conversion means for converting the kana characters to kanji characters is provided additionally.

26. The character input apparatus according to claim 22, wherein, when the control unit selects the data and the selected data is displayed on a display unit, the control unit generates the display data so that not only the data selected based on the inclination direction of the operation unit but also one data positioned adjacent to the selected data is displayed simultaneously on the display unit.

27. The character input apparatus according to claim 22, wherein the signal generated by the first detection unit corresponds solely to the inclination direction of the operation unit so long as the operation unit has been inclined by a minimum amount from a center position of the operation unit.

28. The character input apparatus according to claim 22, wherein the character data selected corresponds solely to the inclination direction of the operation unit so long as the operation unit has been inclined by a minimum amount from a center position of the operation unit.

29. The character input apparatus according to claim 22, wherein the character data is provided on a periphery of the operation unit and corresponds to the character data selected when the operation unit is inclined.

30. The character input apparatus according to claim 29, wherein the character data is provided on the entire periphery of the operation unit.

* * * * *

UNITED STATES PATENT AND TRADEMARK OFFICE
CERTIFICATE OF CORRECTION

| | | |
|---|---|---|
| PATENT NO. | : 6,956,559 B2 | Page 1 of 1 |
| APPLICATION NO. | : 09/819273 | |
| DATED | : October 18, 2005 | |
| INVENTOR(S) | : Yasuji Hagiwara et al. | |

It is certified that error appears in the above-identified patent and that said Letters Patent is hereby corrected as shown below:

Column 7, in claim 4, line 2, after "means for converting" delete "the".

Signed and Sealed this

Fourteenth Day of November, 2006

JON W. DUDAS
*Director of the United States Patent and Trademark Office*